United States Patent
Hwang

(10) Patent No.: US 7,492,103 B2
(45) Date of Patent: Feb. 17, 2009

(54) ENERGY SAVING LAMP WITH SENSOR

(76) Inventor: Yoon Kyu Hwang, 105-506, Shinan-netvil apartment complex 1, 868, Banghwa-dong, Kangseo-ku, Seoul, 157-220 (KR)

(*) Notice: Subject to any disclaimer, the term of this patent is extended or adjusted under 35 U.S.C. 154(b) by 175 days.

(21) Appl. No.: 10/567,807

(22) PCT Filed: Aug. 17, 2004

(86) PCT No.: PCT/KR2004/002052

§ 371 (c)(1),
(2), (4) Date: Feb. 8, 2006

(87) PCT Pub. No.: WO2005/018286

PCT Pub. Date: Feb. 24, 2005

(65) Prior Publication Data

US 2006/0261741 A1  Nov. 23, 2006

(30) Foreign Application Priority Data

Aug. 18, 2003  (KR) .................. 20-2003-0026511 U

(51) Int. Cl.
*H01J 13/46* (2006.01)
(52) U.S. Cl. ........................ 315/56; 315/71; 315/129; 315/363
(58) Field of Classification Search .................. 315/56, 315/71, 129, 363, 149, 158; 340/568.1; 439/467
See application file for complete search history.

(56) References Cited

U.S. PATENT DOCUMENTS

| | | | | |
|---|---|---|---|---|
| 1,963,156 A | * | 6/1934 | Stewart | 362/327 |
| 6,168,282 B1 | * | 1/2001 | Chien | 362/84 |
| 6,320,506 B1 | * | 11/2001 | Ferraro | 340/568.1 |
| 6,580,221 B2 | * | 6/2003 | Hutzler et al. | 315/149 |
| 6,739,737 B2 | * | 5/2004 | Yu | 362/300 |
| 6,820,998 B2 | * | 11/2004 | Chen | 362/276 |
| 7,005,802 B2 | * | 2/2006 | Myron et al. | 315/56 |
| 7,128,448 B2 | * | 10/2006 | Fischer et al. | 362/378 |
| 2006/0238136 A1 | * | 10/2006 | Johnson, III et al. | 315/185 R |

FOREIGN PATENT DOCUMENTS

| | | |
|---|---|---|
| JP | 2003-132704 | 5/2003 |
| KR | 2001-0251470 | 11/2001 |
| KR | 2003-0309513 | 4/2003 |

* cited by examiner

*Primary Examiner*—Douglas W. Owens
*Assistant Examiner*—Chuc Tran
(74) *Attorney, Agent, or Firm*—Allen, Dyer, Doppelt, Milbrath & Gilchrist, P.A.

(57) ABSTRACT

Disclosed is a multi-functional energy-saving fluorescent lamp in which an illumination sensor for distinguishing day and night, a timer for time control, and an infrared sensor for sensing a human are integrally provided to one lamp as a light source. The sensors measure illumination according to quantity of light or sense existence of a human. If the illumination around the lamp is lower than a certain level, e.g. at night, or a human exists, the sensors send a data signal for driving a lighting control circuit so that the lamp is automatically turned on/off. This lamp has simple structure and ensures low energy consumption. In addition, by addition of a reflection shade, heat emitted from the lamp is blocked and the illumination efficiency is improved. This lamp may be conveniently installed to any place using a socket-type light bulb without any separate sensor, thereby greatly improving convenience of a user.

11 Claims, 6 Drawing Sheets

ENERGY SAVING LAMP WITH SENSOR

TECHNICAL FIELD

The present invention relates to an automatic control energy-saving lamp device integrated with a combination sensor, and more particularly to a multi-functional energy-saving fluorescent lamp device in which an illumination sensor for distinguishing day and night, a timer for time control, and an infrared sensor for sensing a human are integrally provided to one lamp as a light source so that the sensors measure illumination according to quantity of light or sense existence of a human, wherein, if the illumination around the lamp is lower than a certain level, e.g. at night, or a human exists, the sensors send a data signal for driving a lighting control circuit so that the lamp device is automatically turned on/off, thereby ensuring low energy consumption with a simple structure, and wherein, by addition of a reflection shade, heat emitted from the lamp is blocked and the illumination efficiency is improved and the lamp device may be conveniently installed to any place using a socket-type light bulb without any separate sensor, thereby greatly improving convenience of a user.

BACKGROUND ART

Generally, a lamp device is a light source for brightening a dark place or at night by means of light emitted from a lamp mounted in a lamp case. Most glow lamps, or a part of fluorescent lamps, among the lamp devices are configured to make a connection by fitting each of them into a screwed socket in order to receive power, which ensures their ordinary usage, regardless of their installing type such as an exposed type or a buried type on the wall.

The socket-type lamp device is mainly used in places such as street, apartment or house passage, stairway, the porch, or bathroom where management for lighting time is required due to frequent passage of persons in order to prevent an unnecessary waste of power.

In order to solve this problem, a conventional automatic control lamp device includes, together with a lamp as a light source, an illumination sensor (e.g., a CdS sensor) for sensing brightness of a surrounding place where recognition of illumination at day and night and constant turning on/off are required, and an infrared sensor (e.g., a Passive Infra-Red (PIR) sensor) for controlling the lamp to be automatically turned on or off according to the presence of the subject at a place where the lamp should be turned on/off according to entrance and exit of a person, selectively or in combination as necessary. The sensor(s) is generally provided in one lamp case having a body and a cover with each sensor being separated from the lamp.

That is to say, the conventional automatic control lamp device automatically turns on when the illumination sensor or the human-responsive sensor (or, the infrared sensor) installed in one lamp case together with the lamp senses the set brightness or the passage of a person and then allows supply of power to the lamp, and then automatically turns off a certain time after, for example, the passage of the human, thereby ensuring automatic control of the lamp.

Thus, the automatically controlled lamp device as mentioned above does not emit light if the surrounding illumination is lower than a predetermined level or the presence or movement of a human is not detected, thereby preventing an unnecessary waste of energy.

However, the conventional automatic control lamp device may sense surrounding illumination regardless of the presence of a human, so it turns on at a certain condition for a set time and then turns off. In addition, a conventional lamp device with the infrared sensor for sensing a human may turn on regardless of the brightness of the surroundings. In addition, another lamp device in which at least one improved sensor is covered by a cover separately from a lamp may be used for a dedicated installation, so its usage is impossible if the dedicated installation is not equipped. Thus, such a lamp device is very inconvenient to use and cumbersome to change or repair. In addition, since a lamp should be separately provided in the lamp case together with many sensors having different functions as necessary, the lamp device has a complicated configuration and a large size and suffers from deficient productivity due to the increased number of processes.

DISCLOSURE OF THE INVENTION

The present invention is designed to solve such problems of the prior art, and therefore an object of the invention is to provide a multi-functional energy-saving fluorescent lamp device in which an illumination sensor for distinguishing day and night, a timer for time control, and an infrared sensor for sensing a human are integrally provided to one lamp as a light source so that the sensors measure illumination according to quantity of light or sense existence of a human, wherein, if the illumination around the lamp is lower than a certain level, e.g. at night, or a human exists, the sensors send a data signal for driving a lighting control circuit so that the lamp is automatically turned on/off, thereby ensuring low energy consumption with a simple structure, and wherein, by addition of a reflection shade, heat emitted from the lamp is blocked and the illumination efficiency is improved and the lamp device may be conveniently installed to any place using a socket-type light bulb without any separate sensor, thereby greatly improving convenience of a user.

Specific configuration of the present invention in order to accomplish the above object is as follows, wherein detailed descriptions for well-known functions and structures which may make the point of the invention be obscure unnecessary are excluded, and the same reference numeral is endowed to the same component.

In one aspect of the invention, there is provided an automatic control energy-saving lamp device in which a plurality of U-shaped lamps are fixed to a socket body including a lighting control circuit for controlling the lamps to be turned on/off and a screw-fitting socket screw is extended to the socket body so as to receive power by means of an electrical socket connection, wherein an illumination sensor for sensing a surrounding illumination and a timer for controlling a lighting time are integrally provided in the socket body together with the lighting control circuit for controlling the lamps to be turned on/off according to a predetermined program included therein, wherein an infrared sensor for sensing movement of a human is protruded downward on an end of a sensor support extended a predetermined length at a center of the U-shaped lamps arranged in a square structure on a base, which has a cover function and has a combination unit on a lower portion thereof so as to be combined to combination grooves of the socket body, with the sensor support being surrounded by high-illumination reflection shades for blocking light of the lamp.

A first feature of the present invention is to integrally configure the lamp as a light source, the illumination sensor for distinguishing day and night by sensing light around the lamp, the timer for time control, and the infrared sensor for sensing a human so as to compositely sense illumination and movement of a human and make the lamp be automatically turned on/off, not configuring a lamp and a sensor separately in one case. A second feature of the present invention is to provide a lamp device which may be easily mounted in any place which uses a screw-type socket bulb without any sensing device, thereby greatly improving convenience of a user.

BRIEF DESCRIPTION OF THE DRAWINGS

These and other features, aspects, and advantages of preferred embodiments of the present invention will be more fully described in the following detailed description, taken accompanying drawings. In the drawings.

EXPLANATION OF REFERENCE NUMBERS

Figure 1:
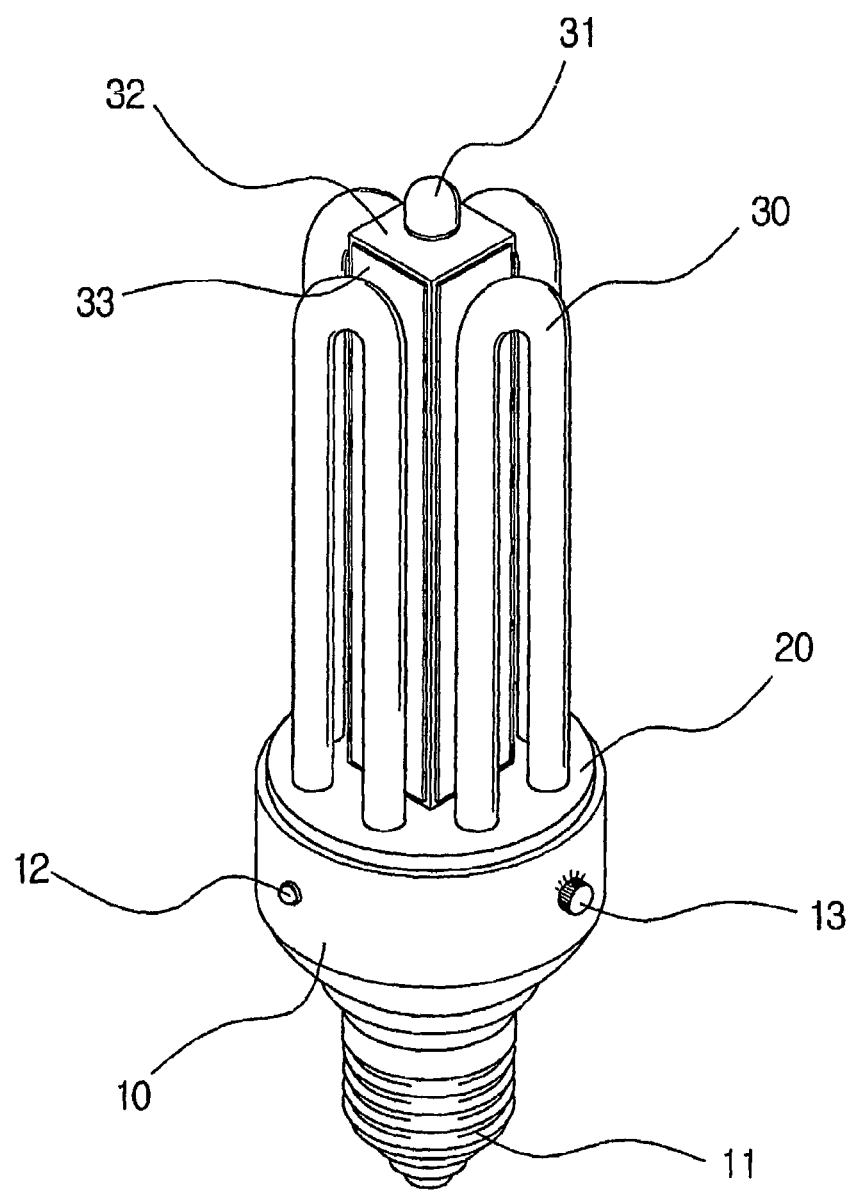
FIG. 1 is a perspective view showing a lamp device according to the present invention.

10: Socket body
11: Socket screw
12: Illumination sensor
13: Timer
14: Line
15: Combination groove(s)
20: Base
21: Combination unit
30: Lamp
31: Infrared sensor
32: Sensor support
33: High-illumination reflection shade
34: Lamp cover
40: Control circuit
41: Microprocessor
42: Memory
43: Power controller

BEST MODES FOR CARRYING OUT THE INVENTION

Hereinafter, a preferred embodiment of the present invention will be described in detail with reference to the accompanying drawings.

Referring to FIG. 1, in a lamp device of the present invention, a power-connecting socket screw 11 using a screwing fitting manner is protruded from one end of a socket body 10 integrally formed thereto. A spiral screw is formed on the outer circumference of the socket screw 11 so that a power source (not shown) is electrically connected thereto by screwing fitting. On the socket body 10, an illumination sensor 12 acting as a light receiving sensor (e.g., a CdS sensor) for sensing brightness around it and a timer 13 for controlling a turning-on time of a lamp are provided. A lighting control circuit 40 for receiving power from the socket screw 11 acting as a connection terminal so as to apply the power to the sensor by means of a switching operation is provided in the socket body 10. The lighting control circuit 40 controls a lamp 30 to be turned on/off by recognizing a signal of the illumination sensor 12 for sensing brightness and an infrared sensor 31 for sensing a human.

The lighting control circuit 40 includes a microprocessor 41 programmed to determine data input of the sensors and control the lamp to be turned on/off, a memory 42 for storing data of the sensors, and a power controller 43 for receiving a utility AC power and then converting it into a DC power and rectifying and supplying it. A key input unit may be added to the lighting control circuit 40.

In addition, the lamp 30 is a common curved-tube lamp which is curved in a U shape. Many lamps 30 (e.g., four lamps 30) are arranged in a rectangular relation with good space utility on a disk-shaped base 20 combined to the socket body 10. The infrared sensor 31 for sensing a human is provided at an end position of a central space among the U-shaped lamps. Thus, a sensor support 32 with a predetermined length is mounted among the lamps 30, and the infrared sensor 31 is mounted on the end of the sensor support 32. The sensor support 32 is surrounded by a high-illumination reflection shade 33 on which silver or aluminum is coated by deposition. The high-illumination reflection shade 33 acts as a high-efficiency light reflection means for blocking and reflecting light from the lamps in order to prevent malfunction of the infrared sensor 31.

Figure 2:
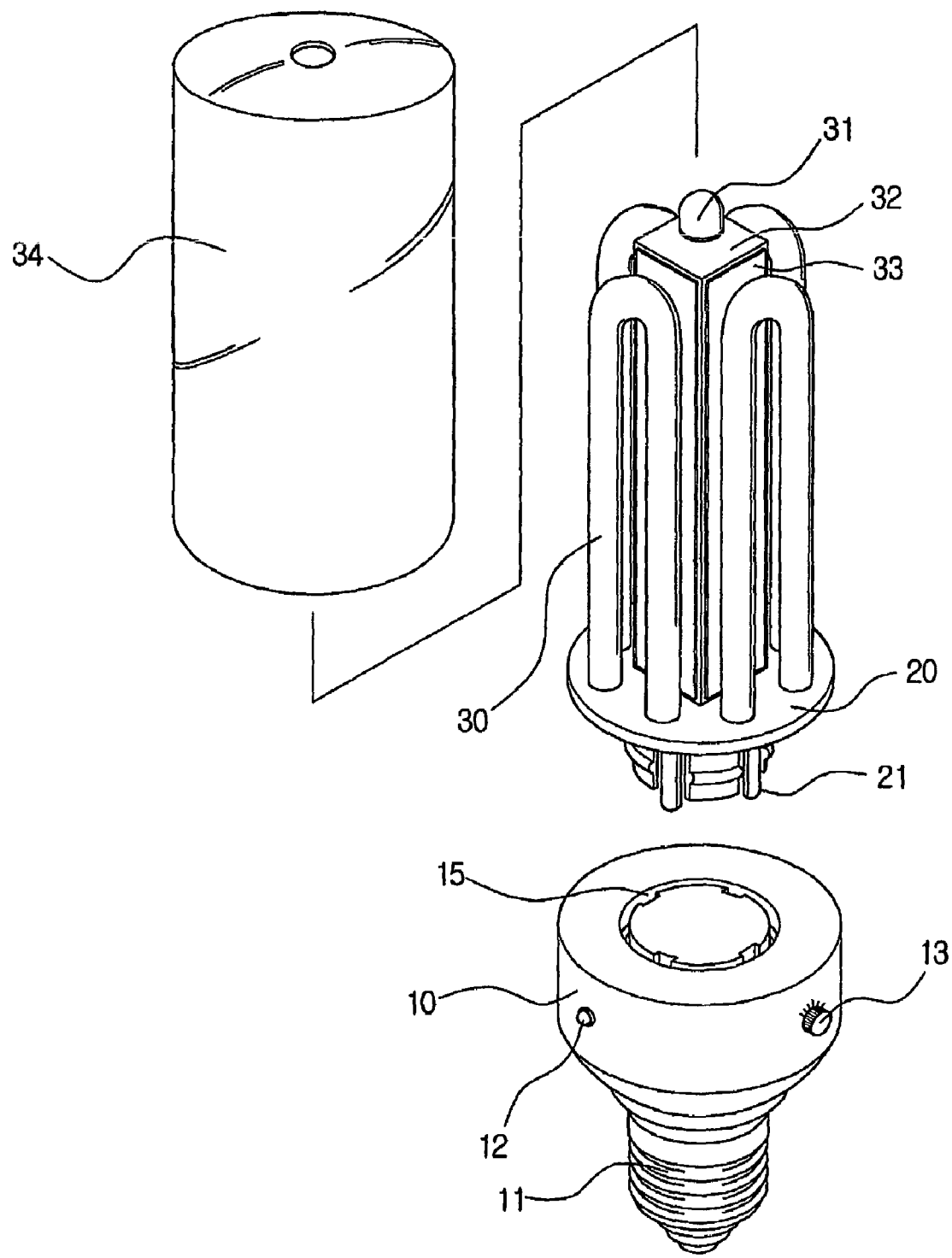
FIG. 2 is an exploded perspective view showing the lamp device according to the present invention.
Figure 3:
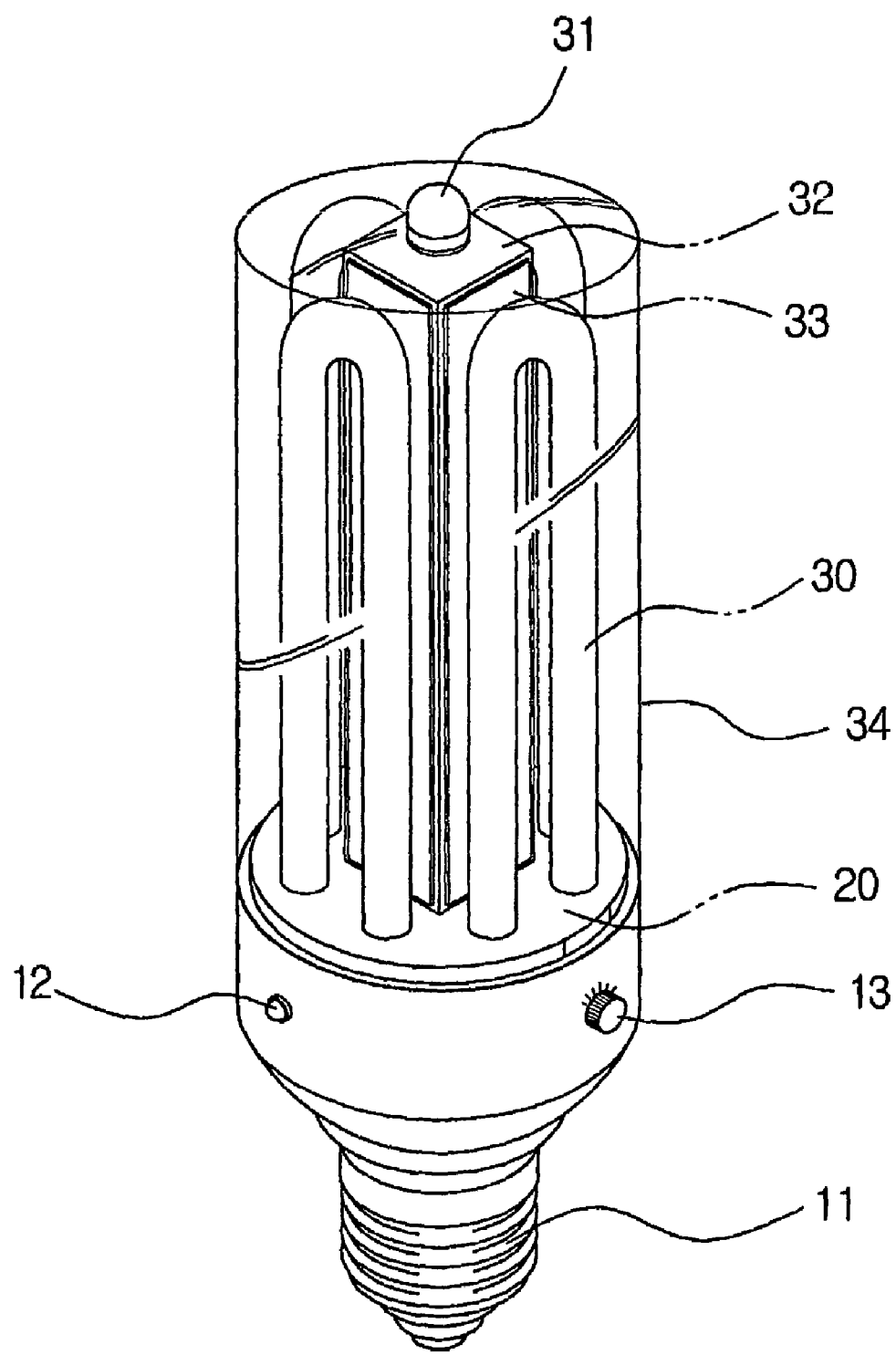
FIG. 3 is a perspective view showing the lamp device in which a lamp is covered by a cover according to one embodiment of the present invention.
Figure 4:
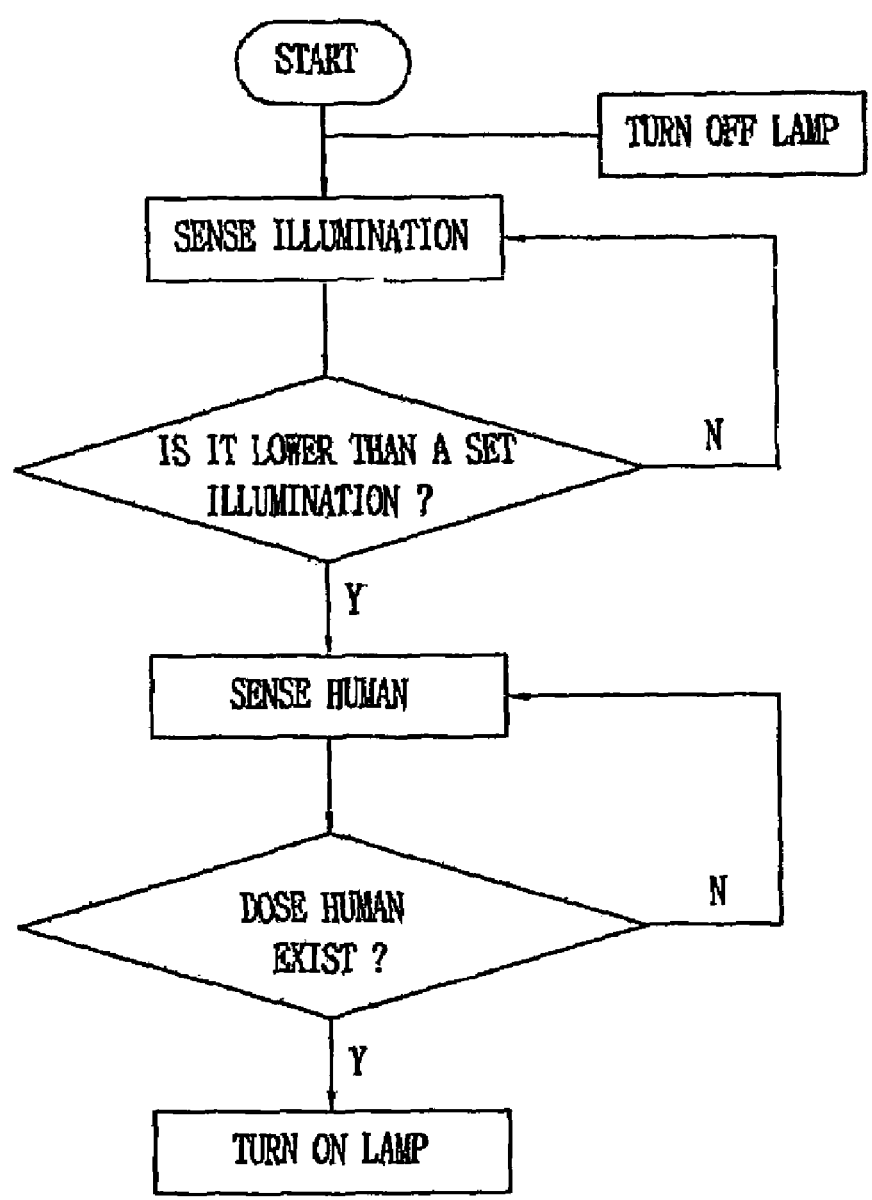
FIG. 4 is a flowchart for illustrating an operation of the lamp device according to the present invention.
Figure 5:
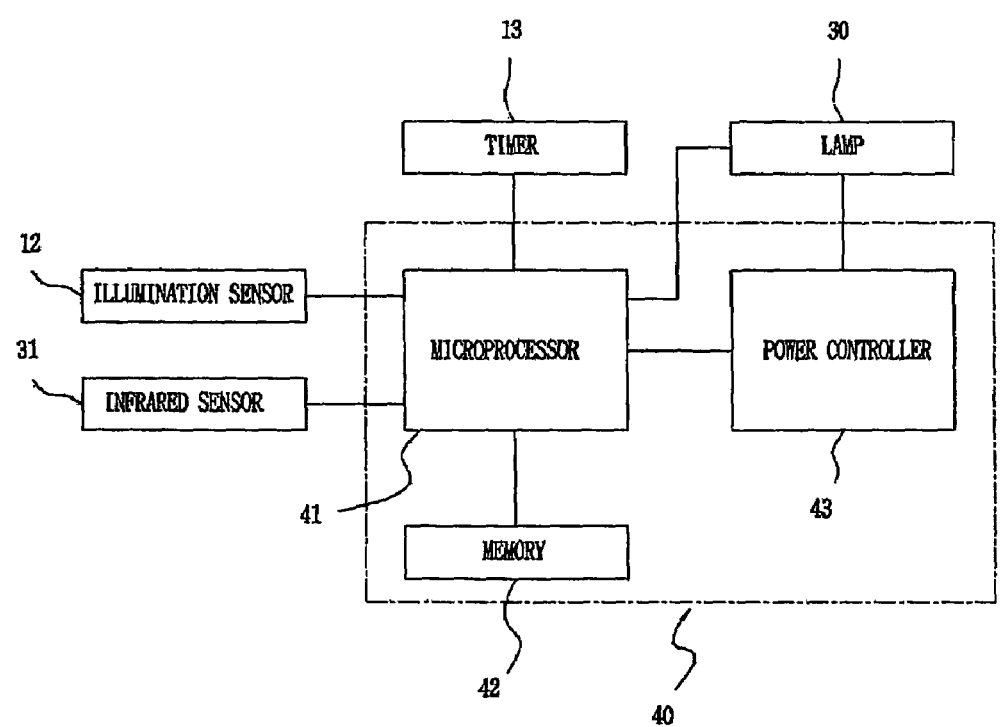
FIG. 5 is a block diagram showing electric configuration of the lamp device according to the present invention.
Figure 6:
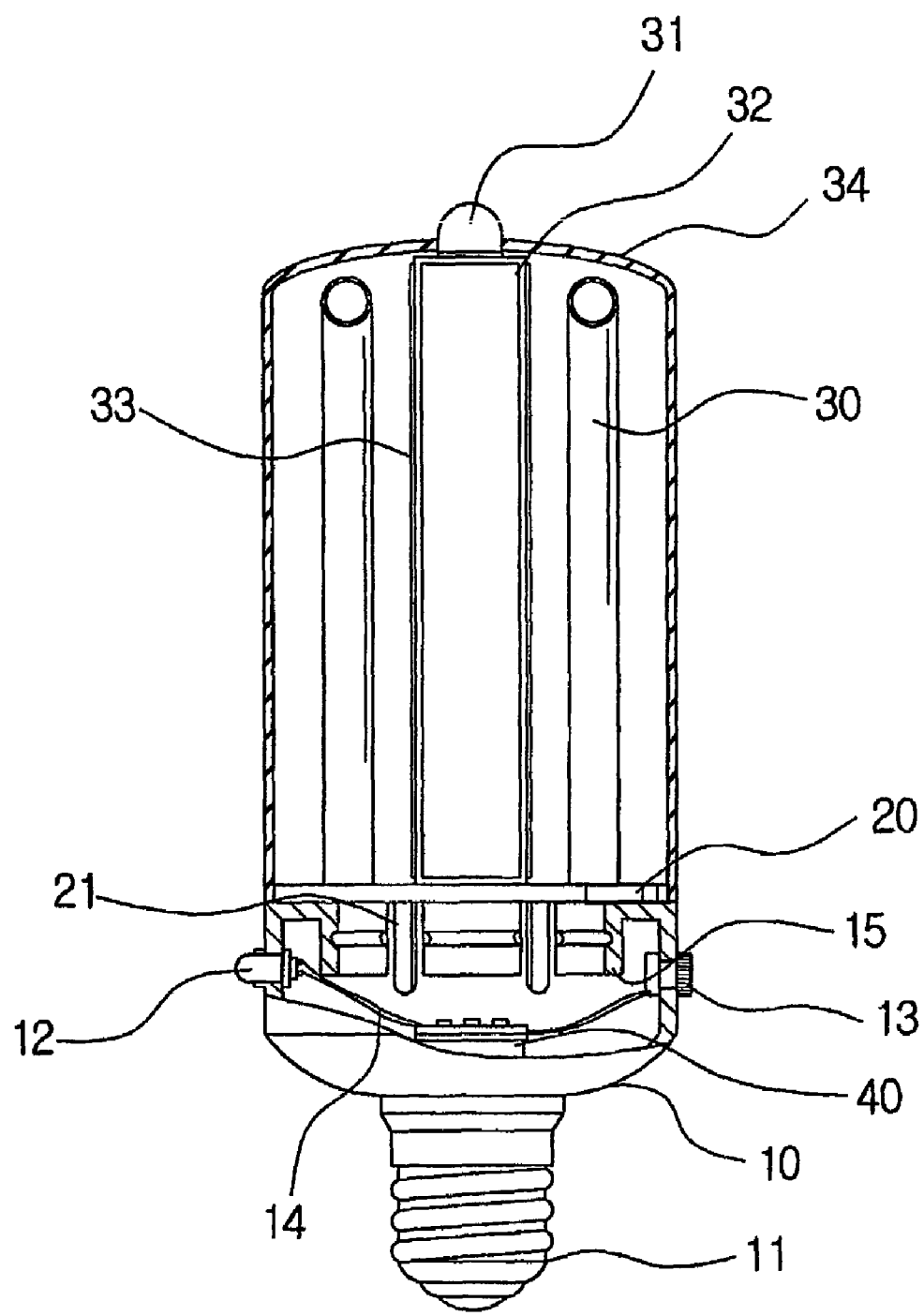
FIG. 6 is a sectional view showing the lamp device according to the present invention.

As another embodiment, a detachable lamp cover 34 made of translucent plastic or glass may be provided in order to minimize introduction of external dust for protection of the lamps and improve beauty of the lamp device, as shown in FIGS. 2 and 3. In this case, the infrared sensor 31 is protruded at a center of the cover 34 outward so that the infrared sensor 31 may sense a human more easily in a maximized range.

The sensor support 32 may has a shape of a rectangular case or a cylinder, and makes a module together with four lamps so that its overall outline becomes a square by means of four lamps symmetrically arranged. The infrared sensor 31 formed on the end of the sensor support 32 emits an infrared ray in a direction of the light emitted from the lamp 30. The infrared sensor 31 is also protruded so long that a ray reflected by an object may be sensed and a lateral sensing range is maximized. The illumination sensor 12 is preferably buried in the socket body 10 positioned upon the lamps as much as a predetermined depth (for example, 5 mm) so that a direct ray of light is not received from the lamps.

Of course, the lamp device according to the present invention may have a vacuum bulb, coated with a 3-wave lamp fluorescent material capable of emitting a light with a substantial natural color, mounted to the body including a socket 11 a so that it may be used even for a glow lamp socket. The U-shaped lamp may be replaced with an I-shaped lamp. In addition, there are preferably at least two lamps (in a symmetric structure), preferably three (in a triangle structure) or four lamps so that the infrared sensor 31 is provided at the center between or among the lamps.

The illumination sensor 12 and the infrared sensor 21 are respectively provided with a common sensor control circuit in a module, which is electrically connected to the lighting control circuit 40. The lighting control circuit 40 is a circuit board including a predetermined electronic circuit or integrated circuit, so it analyzes a signal data of the illumination sensor generated by a surrounding light intensity and a signal data of the infrared sensor generated by sensing a human by means of the operation of the microprocessor 41 including an individual program. If it is determined that the surrounding brightness is lower than a set illumination and a human exists, the lighting control circuit 40 controls the lamps to be turned on/off by operating the timer 13, thereby saving an electric energy. It is a commonly used configuration, not described in detail here.

In addition, the lamp device of the present invention may be configured so that the socket may be divided into upper and lower portions, which are detachably assembled. In the detachable configuration, the socket is separated into the upper base 20 having the lamps 30 and the socket body 10 having the lighting control circuit 40. At this time, a combination unit 21 having protrusions in all directions extended below is formed on a substrate of the upper base 20, and combination grooves 15 corresponding to the protrusions are formed in the socket body 10. Thus, the upper and lower portions of the socket may be easily assembled and dissembled just by inserting or releasing the protrusions of the combination unit 21 on the base into or from the combination grooves 15. It gives convenience and economy to a user when he/she changes the lamp after its life cycle or repairs the lamp device due to disorder of the lighting control circuit since there is no need to exchange the entire lamp device.

As described above, if the lamp device of the present invention is installed to various places such as passage or stairs of an apartment, a bathroom or the like and a power is applied thereto through the socket screw 11, the lighting control circuit 40 is operated to control the lamps to be turned on/off by means of the power controller 43 when it is determined that an illumination is lower than a set level by the sensing signal of the illumination sensor for sensing brightness, or at night, and when an object such as a human is sensed by the infrared sensor 31. Thus, the lamps are automatically turned on/off during a predetermined time set suitably for the surroundings or while the human is in the place without any separate lighting switch, thereby preventing an unnecessary energy consumption and saving an electric energy.

The present invention described above may be substituted or modified within the scope of the invention, not departing from the technical aspect of the invention, to those ordinarily skilled in the art, not limited to the embodiment.

INDUSTRIAL APPLICABILITY

As described above, the present invention provides a multi-functional energy-saving fluorescent lamp device in which an illumination sensor for distinguishing day and night, a timer for time control, and an infrared sensor for sensing a human are integrally provided to one lamp as a light source so that the sensors measure illumination according to quantity of light or sense existence of a human. Thus, if the illumination around the lamp is lower than a certain level, e.g. at night, or a human exists, the sensors send a data signal for driving a lighting control circuit so that the lamp device is automatically turned on/off, thereby ensuring low energy consumption with a simple structure. In addition, by addition of the reflection shade, heat emitted from the lamp is blocked and the illumination efficiency is improved. Moreover, the lamp device may be conveniently installed to any place using a socket-type light bulb without any separate sensor, thereby greatly improving convenience of a user. Furthermore, when the socket body is detachable, only the lamp may be exchanged, thereby ensuring economy and easy maintenance and repair.

What is claimed is:

1. An automatic control energy-saving lamp device comprising a plurality of lamps and a socket body having the lamps fixed to one side of the body and having a screw formed to the other side of the body, the device comprising:

an illumination sensor formed on the socket body for sensing a surrounding illumination;

a timer for controlling a lighting time of the lamps;

an infrared sensor mounted to one side of the lamps for sensing movement of a human; and a lighting control circuit formed in the socket body, and controlling the lamps to be turned on/off according to output signals of the illumination sensor, the timer and the infrared sensor;

a base having the plurality of lamps fixed to one side of the base and having a combination unit formed on the other side of the base; and a combination groove formed in the socket body to detachably combine with the combination unit.

2. The automatic control energy-saving lamp device according to claim 1, further comprising a sensor support with a predetermined length; and high-illumination reflection shades surrounding the sensor support and coated by deposition of silver or aluminum, among the plurality of lamps.

3. The automatic control energy-saving lamp device according to claim 2, wherein the infrared sensor is mounted on an end of the sensor support.

4. The automatic control energy-saving lamp device according to claim 3, further comprising a detachable lamp cover made of plastic or glass.

5. The automatic control energy-saving lamp device according to claim 4, wherein the infrared sensor protrudes outwardly through the center of the lamp cover.

6. The automatic control energy-saving lamp device according to claim 1, wherein the illumination sensor is buried in the socket body as much as a predetermined depth in order not to receive a direct ray of light from the lamps.

7. The automatic control energy-saving lamp device according to claim 6, wherein the predetermined depth is 5 mm.

8. The automatic control energy-saving lamp device according to claim 1, wherein a number of the plurality of lamps is two to four.

9. The automatic control energy-saving lamp device according to claim 8, wherein the lamps are vacuum bulbs coated with a 3-wave lamp fluorescent material.

10. The automatic control energy-saving lamp device according to claim 1, wherein the lamps are U-shaped or I-shaped lamps.

11. An automatic control energy-saving lamp device comprising a plurality of lamps and a socket body having the lamps fixed to one side of the body and having a screw formed to the other side of the body, the device comprising:

an illumination sensor formed on the socket body for sensing a surrounding illumination;

a timer for controlling a lighting time of the lamps;

an infrared sensor mounted to one side of the lamps for sensing movement of a human;

a lighting control circuit formed in the socket body, and controlling the lamps to be turned on/off according to output signals of the illumination sensor, the timer and the infrared sensor;

a sensor support with a predetermined length, wherein the sensor support extends in the longitudinal direction of the lamp, the infrared sensor being disposed at one end of the sensor support; and high-illumination reflection shades surrounding the sensor support and coated by deposition of silver or aluminum, among the plurality of lamps.

* * * * *